US005670086A

United States Patent [19]

Papadopoulos et al.

[11] Patent Number: 5,670,086
[45] Date of Patent: Sep. 23, 1997

[54] VITRIFIED PHOSPHOR ARTICLES, INTERMEDIATES, AND PREPARATION METHODS

[75] Inventors: Kimon Papadopoulos, Penfield; Kurt D. Sieber, Rochester, both of N.Y.

[73] Assignee: Eastman Kodak Company, Rochester, N.Y.

[21] Appl. No.: 603,965

[22] Filed: Feb. 20, 1996

[51] Int. Cl.$^6$ .......................... C09K 11/61; C03C 10/02
[52] U.S. Cl. .......................... 252/301.4 P; 252/301.4 R; 252/301.4 H; 501/3; 501/43; 501/40; 501/57; 501/56
[58] Field of Search .................. 252/301.4 R, 301.4 H, 252/301.4 P; 501/3, 43, 40, 57, 56

[56] References Cited

U.S. PATENT DOCUMENTS

| | | | |
|---|---|---|---|
| 3,880,663 | 4/1975 | Shaw et al. | 501/43 |
| 4,380,702 | 4/1983 | Takahashi et al. | 250/327.2 |
| 4,491,736 | 1/1985 | Teraoka | 250/484.1 |
| 4,912,333 | 3/1990 | Roberts et al. | 250/487.1 |
| 5,028,509 | 7/1991 | Shimada et al. | 430/139 |
| 5,271,978 | 12/1993 | Vazan et al. | 428/64 |
| 5,436,919 | 7/1995 | Chwalek | 372/7 |

FOREIGN PATENT DOCUMENTS

| | | |
|---|---|---|
| 7162062 | 6/1995 | Japan . |
| WO 9518196 A1 | 7/1995 | WIPO . |

OTHER PUBLICATIONS

H. Rawson, Academic Press, Inorganic Glass–Forming Systems (1967), pp. 236–245 *no month.

G. Muller et al., J. Appl. Phys., Glass ceramic—a new laser host material, (May 1973), vol. 44, No. 5, pp. 2315–2318.

W. Xu et al., Elsevier, The blue up–conversion emission of glass ceramics doped with $Er^{3+}$ ion upon green line (19435 cm-1) excitation, (1994), vol. 224, pp. 56–60, Jul.

O. L. Malta et al., Up–Conversion Yield in Glass Ceramics Containing silver, (1987), Journal of Solid State Chemistry, vol. 68, pp. 314–319 *no month.

Research Disclosure, J. E. Harvey, (Aug. 1979), vol. 184, Item 18431, pp. 433–441.

Doctoral Thesis, Rijksuniversiteit Te Utrecht, Luminescence of New X–Ray Phosphors, (May 1990).

*Primary Examiner*—Melissa Bonner
*Attorney, Agent, or Firm*—Carl O. Thomas

[57] ABSTRACT

Vitrified phosphor articles, intermediates, and methods for preparing the articles. In the methods, a combination of species are admixed. The combination of species are precursors for a glass-forming system. The glass-forming system includes precursors for a crystalline radiographic phosphor. The admixed combination of species are fired to form a melt having a single liquid. The product of the melt is molten-shaped.

16 Claims, 3 Drawing Sheets

VITRIFIED PHOSPHOR ARTICLES, INTERMEDIATES, AND PREPARATION METHODS

FIELD OF THE INVENTION

The invention relates to vitrified articles and to phosphors and to methods for their preparation and more particularly relates to glass-ceramic phosphor articles and vitreous intermediates including phosphor compositions and to preparation methods.

BACKGROUND OF THE INVENTION

A wide variety of luminescent articles are used to convert electromagnetic radiation from one wavelength to another longer wavelength, either on a prompt basis or after a period of storage followed by secondary stimulation using light or heat. Typical of such articles are radiographic storage and intensifying screens. In radiographic screens, x-radiation is converted to visible light on a image-wise basis for the purpose of medical diagnosis or the like. Radiographic screens have exacting standards for the quality of the visible image produced. To meet these standards, the screens commonly have luminescent layers which have very high concentrations of phosphor crystals in a binder. As a result, the layers are generally not self-supporting and must be borne by a supporting sheet of polymeric film. This is usually not a problem and the resulting screens are very useful for most purposes. A problem is presented, however, if the screens are to be used under conditions in which the supporting sheet, and the binder of the luminescent layer, would be likely to degrade.

Glasses and ceramics are well suited to many environments in which organic polymers, and even inorganic polymers, are subject to degradation. An extensive variety of inorganic glasses is known. The oxides $SiO_2$, $GeO_2$, $B_2O_3$, $P_2O_5$, and $As_2O_3$ readily form the disordered networks which are characteristic of the vitreous state. Other oxides, while not in themselves network-formers, will readily behave as such in the presence of an additional component. Examples of such conditional network formers include $TeO_2$, $SeO_2$, $MoO_3$, $WO_3$, $Bi_2O_3$, $Al_2O_3$, $Ga_2O_3$, and $V_2O_5$. Common inorganic glasses often comprise several network-modifying components in addition to the network formers. Inorganic glasses are not limited to oxides; a notable non-oxide network former is $BeF_2$, which is the basis of several vitreous fluoride systems having close structural and thermodynamic analogues among the silicates, as taught by *Inorganic Glass-Forming Systems*, Rawson, H., Academic Press, New York, (1967) p. 236–245. $BeF_2$-based glass-forming systems are potentially attractive in preparing glass-ceramic phosphor articles because of their low x-ray absorption.

It is well known in glass technology that most glasses will crystallize under appropriate conditions. When the crystallization process is suitably controlled, useful materials known as glass-ceramics are obtained. The term "vitrified" is used herein to refer to products of a vitrification process. Stating this another way, "vitrified" includes both vitreous articles and partially vitreous articles, i.e., glass-ceramic articles having crystals dispersed in a glass matrix, and articles that have fully vitreous portions as well as glass-ceramic portions.

"Glass ceramic—a new laser host material", G. Muller et at., *J. Appl. Phys.*, Vol. 44, No. 5, (May 1973) pp. 2315–2318 teaches fluorescent $SiO_2$—$LiAlO_2$—$(Mg,Zn)Al_2O_4$ glass-ceramics (which also include $Ta_2O_5$ and an oxide of Nd or other activator). The ceramic included three crystalline phases in addition to a residual glass phase. The Nd ions were found to have two different hosts in the glass-ceramic.

"The blue up-conversion emission of glass ceramics doped with $Er^{3+}$ ion upon green line (19436 $cm^{-1}$) excitation", W. Xu, et at., *Chemical Physics Letters*, Vol. 224, (1994) pp. 56–60 teaches luminescent $PbF_2$+$GeO_2$:$ErF_3$ glass-ceramics. These glass-ceramics exhibited weak violet and strong blue up-conversion of green light.

"Up-Conversion Yield in Glass Ceramics Containing Silver", O. L. Malta, et at., *Journal of Solid State Chemistry*, Vol. 68, (1987) pp. 314–319 teaches up-conversion of 960 nm radiation to visible light with $PbF_2$—$GeO_2$ glass ceramics.

Abstract of JP 7162062-A teaches an up-conversion laser material consisting of fine sphere of F-, Cl-, Br-, or ClF-glass, containing one or more rare earth elements.

U.S. Pat. No. 5,436,919 to Chwalek et al. teaches the rare earth metal fluoride up-conversion materials: Ba—Ln—F and Ca—Ln—F.

WO 9518196-A1 teaches composites which contain phosphor crystals in a sintered glass matrix. The composites are formed by physically incorporating the phosphor crystals in a sol-gel precursor of the glass matrix. The sol-gel precursor and phosphor crystals are then fired at a temperature high enough to vitrify the sol-gel phase, but too low to melt or degrade the phosphor crystals. The composite articles are resistant to environmental degradation, but are subject to processing limitations, since the molten composite material is not homogeneous and is subject to degradation if overheated.

It would thus be desirable to provide vitrified articles and methods for their preparation in which the articles are resistant to environmental degradation and can be prepared by shaping in molten form the product of a homogeneous vitreous melt.

SUMMARY OF THE INVENTION

The invention is defined by the claims. The invention, in at least one of its broader aspects, provides vitrified phosphor articles, intermediates, and methods for preparing the articles. In the methods, a combination of species are admixed. The combination of species are precursors for a glass-forming system. The glass-forming system includes precursors for a crystalline radiographic phosphor. The admixed combination of species are fired to form a melt having a single liquid. The product of the melt is molten-shaped.

It is an advantageous effect of at least some of the embodiments of the invention that there are provided vitrified articles and methods for their preparation in which the articles are resistant to environmental degradation and can be prepared by shaping in molten form the product of a homogeneous vitreous melt.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

In the methods of the invention a vitreous article is first prepared by admixing reactants, firing the admixture to form a vitreous melt product and then shaping the melt product while molten. The resulting shaped vitreous article is an intermediate in the preparation of the glass-ceramic article of the invention. Continuing that preparation, the intermediate is incompletely devitrified, precipitating phosphor crystals and providing the glass-ceramic article of the invention, in which phosphor crystals are dispersed in a residual vitreous matrix.

The admixture of reactants is selected so as to be both a glass-forming system and to be inclusive of reactants necessary for a crystalline phosphor. In the glass-forming system of the invention, the melt produced from the admixture of reactants is a single-liquid, i.e., the melt is homogeneous or substantially homogeneous; and, upon cooling forms a glass that is stable or substantially stable at ambient temperatures, i.e., the glass does not spontaneously devitrify during cooling. Suitable cooling regimes are those employed in the manufacture of optical glasses. The phosphor and its components must also be at least substantially resistant to degradation, i.e., by volatilization or decomposition, under the firing conditions used to prepare the melt. The phosphor is preferably a radiographic phospor and, more preferably, a radiographic storage phosphor.

In preferred embodiments of the invention, the admixture of reactants is further characterized as a combination of species characterized by the structural formula:

$d^1M^aX.d^2M^bX_2.e^1M^a{}_2O.e^2M^bO.qR:jA$     (formula 1)

Each $M^a$ represents one or more of the alkali metals: Li, Na, K, Rb and Cs. Each $M^b$ represents one or more of the divalent metals: Be, Mg, Ca, Sr, Ba, Zn, Cd, Cu, and Ni. Each X represents one or more of the halides: F, Cl, Br, and I. R represents $BeF_2$ or an oxide of B, Si, Ge, and P or a combination thereof. It is currently preferred that R include one or more of the indicated oxides. A represents one or more activators selected from the group: Eu, Tb, Ce, Tm, Dy, Pr, Ho, Nd, Yb, Er, Gd, Lu, Sm, Y, Tl, Na, Ag, Cu, Mg, Pb, Bi, Mn, and In. The values of $d^1$, $d^2$, $e^1$, and $e^2$ are such that:

$d^1+d^2$ is from 0.025 to about 0.5;
$e^1+e^2$ is from 0 to about 0.65;
$d^1+e^1$ is from 0 to about 0.9;
$d^2+e^2$ is from 0 to about 0.9;
$d^1+e^1+d^2+e^2$=from about 0.05 to about 0.9; and
q is from about 0.10 to about 0.95.

The total of $d^1+e^1+d^2+e^2+q$ is thus equal to 1. The value of j is from $1\times10^{-6}$ to about 0.20.

In a particular embodiment of the invention in which R is $B_2O_3$ or $P_2O_5$, or a combination of the two:
$d^1$ is from 0 to about 0.5,
$d^2$ is from 0 to about 0.5,
$e^1$ is from about 0 to about 0.65,
$e^2$ is from about 0 to about 0.65,
$d^1+d^2$ is from 0.025 to about 0.5;
$d^1+e^1$ is from about 0 to about 0.9, and
$d^2+e^2$ is from about 0 to about 0.9.

In another embodiment of the invention in which R is $SiO_2$ or $GeO_2$, or a combination of the two:
$d^1$ is from 0 to about 0.5,
$d^2$ is from 0 to about 0.5,
$e^1$ is from about 0 to about 0.65,
$e^2$ is from about 0 to about 0.65,
$d^1+d^2$ is from 0.025 to about 0.5;
$d^1+e^1$ is from about 0 to about 0.9, and
$d^2+e^2$ is from about 0 to about 0.9.

Figure 1:
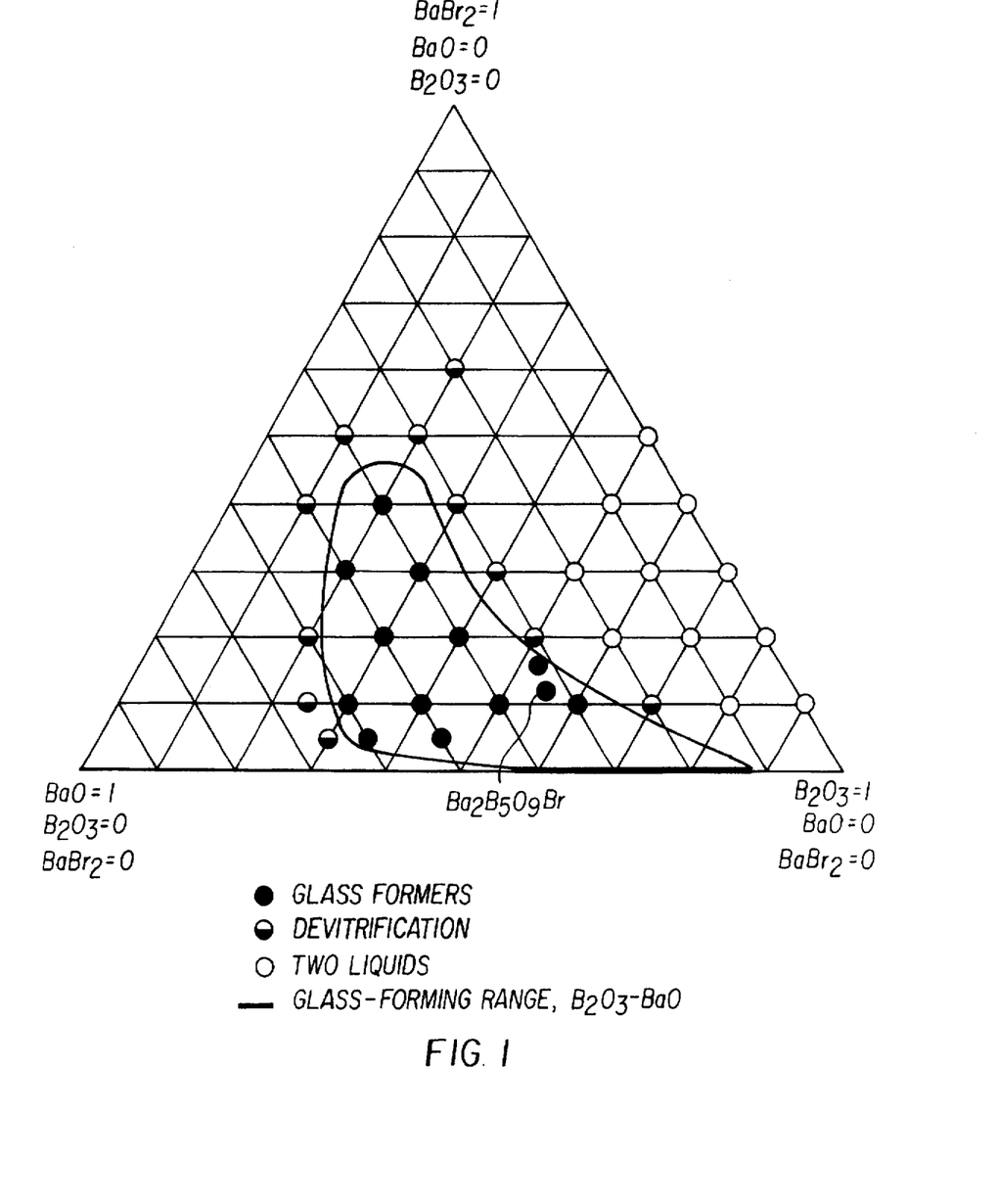
FIG. 1 is a ternary composition diagram for the glass forming system: $B_2O_3$—$BaO$—$BaBr_2$. Each corner represents a mole fraction of 1 of the indicated compound and a mole fraction of 0 for the other two compounds. Each of the boundaries is graduated with divisions in units of a mole fraction of 0.1.
Figure 2:
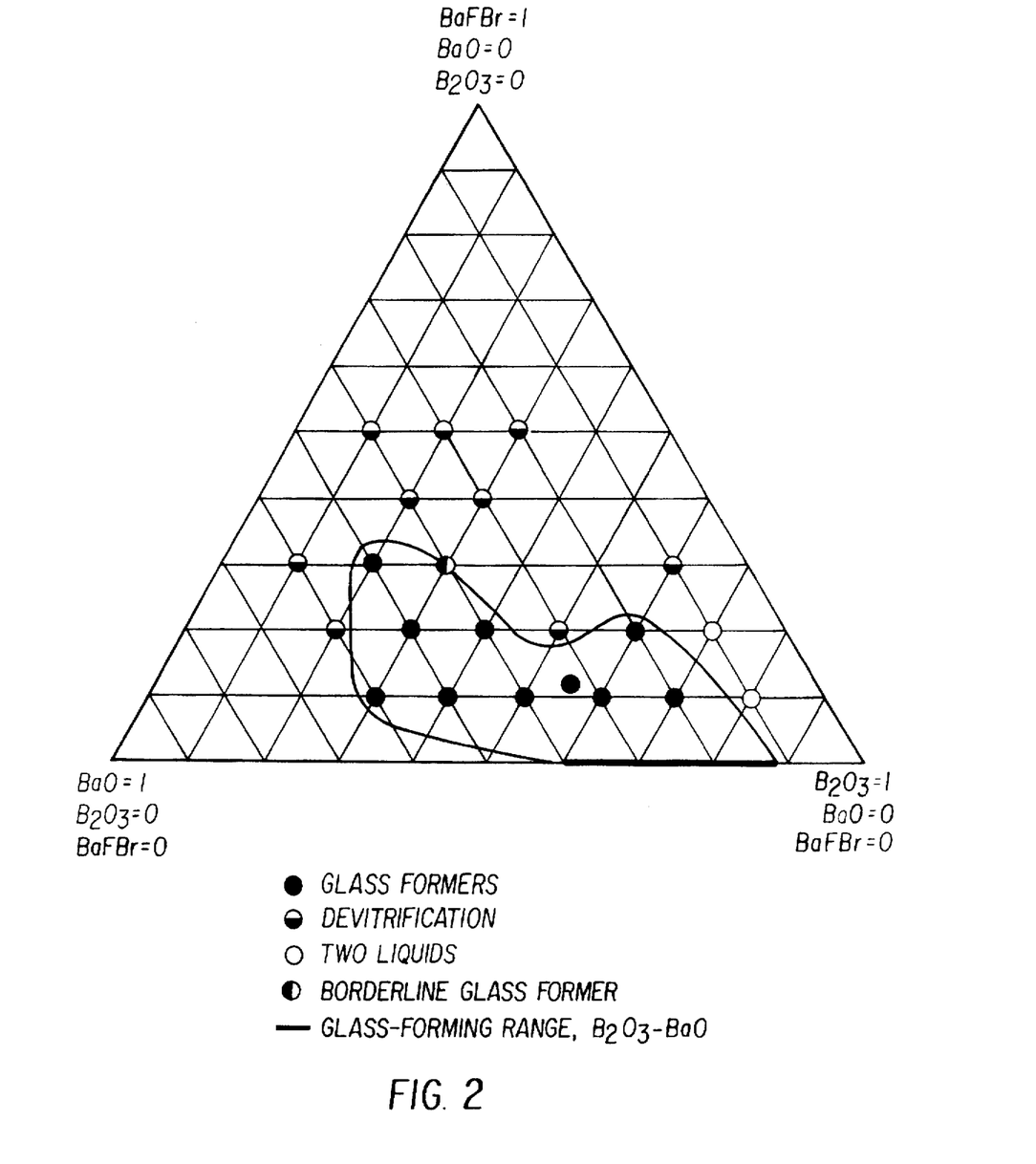
FIG. 2 is a ternary composition diagram for the glass forming system: $B_2O_3$—BaO—BaFBr, illustrated in the same manner as in FIG. 1.
Figure 3:
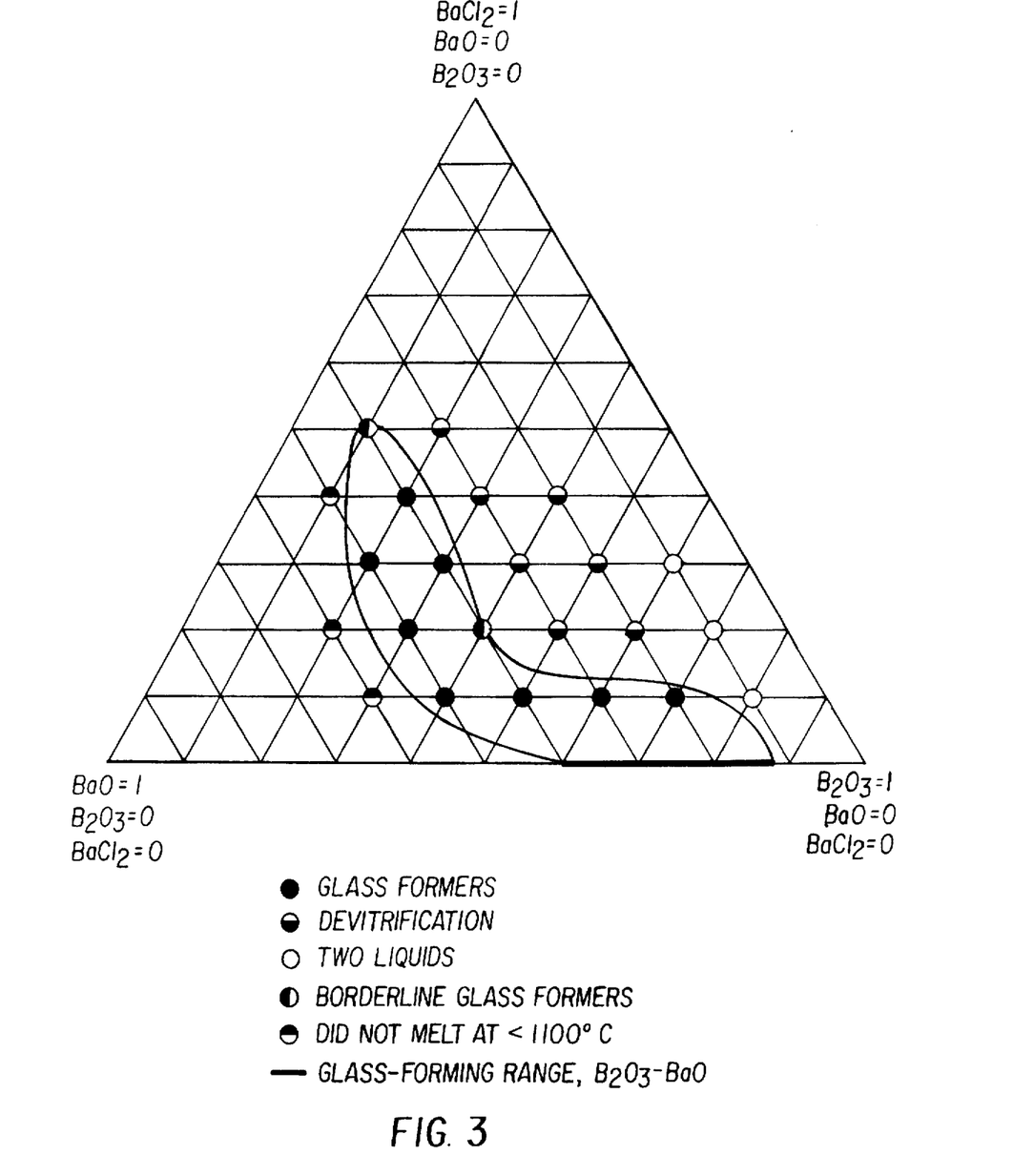
FIG. 3 is a ternary composition diagram for the glass forming system: $B_2O_3$—BaO—$BaCl_2$, illustrated in the same manner as in FIG. 1.

The selection of specific reactants and concentrations for the admixture of reactants is straight-forward and can rely upon simple trial and error based upon the teachings herein and the premise that to form the single liquid (homogeneous or substantially homogeneous) melt, the components of the glass-forming system and the phosphor must all be mutually soluble at glass melting temperatures. The selection of specific reactants and concentrations is illustrated by FIGS. 1–3. Suitable concentrations for the preparation of the glass-forming systems $B_2O_3$—BaO—$BaBr_2$, $B_2O_3$—BaO—BaFBr, and $B_2O_3$—BaO—$BaCl_2$ were determined experimentally and are illustrated in FIGS. 1, 2, and 3, respectively. Expected acceptable regions based upon the experimental data are indicated by solid lines. The experimental mixtures did not include activator; however, similar results would be obtained with activator present. Further characteristics of phosphors produced by these glass-forming systems (with activator present) are discussed below. The reactants can include components that volatilize during firing. Thus, for example, in the glass-forming system of FIG. 1, barium can be supplied as sulfate or nitrate or carbonate and boric acid can be substituted for boric oxide as long as sufficient oxygen is present during firing to produce the required barium and boric oxides.

The vitreous article produced from the melt is a glass having the same composition as the admixture of reactants, except as to volatile components driven off during firing. The glass-ceramic of the invention, as a whole, similarly has the same composition as the melt, but differs in composition internally, between the phosphor crystals and the residual vitreous matrix. The composition of the phosphor crystals, in the preferred embodiments of the invention, is given in formula 2 and discussed in detail, both below.

The glass-forming systems and corresponding phosphors of currently preferred embodiments of the invention are given in Table 1. These phosphors are radiographic phosphors, and in a number of cases, can be used as storage phosphors.

TABLE 1

| Glass-forming system | Phosphor |
|---|---|
| $B_2O_3$—BaO—$BaBr_2$ | $BaBr_2$:Eu, $Ba_2B_5O_9Br$:Eu |
| $B_2O_3$—BaO—$BaF_2$—$BaBr_2$ | BaFBr:Eu |
| $B_2O_3$—BaO—$BaF_2$—$BaBr_2$—$BaI_2$ | $BaFBr_{(x)}I_{(0.5-x)}$:Ba |
| $B_2O_3$—BaO—$BaCl_2$ | $BaCl_2$:Eu |
| $B_2O_3$—$Rb_2O$—RbBr | RfBr:Tl |
| $B_2O_3$—$Cs_2O$—CsCl | CsCl:Eu |
| $B_2O_3$—$Cs_2O$—CsBr | CsBr:Eu |
| $B_2O_3$—$Cs_2O$—CsBr—CaO—$CaBr_2$ | $CsCaBr_3$:Tl |
| $SiO_2$—BaO—$BaBr_2$ | $Ba_5SiO_4Br_6$:Eu |
| $GeO_2$—BaO—$BaBr_2$ | $Ba_5GeO_4Br_6$:Eu |
| $P_2O_5$—CaO—$CaCl_2$ | $Ca_2PO_4Cl$:Eu |

Currently even more preferred are the glass-forming systems and phosphors listed in Table 1 in which R is $B_2O_3$ and the phosphor is an alkaline earth halide. In a particular embodiment of the invention, the phosphor is barium fluorohalide and the concentration of alkali metal in the admixture of reactants is limited so that in the final phosphor the mole ratio of alkali metal to alkaline earth metal is less than about 0.1:1. In another particular embodiment of the invention, the phosphor is alkali halide and the the concentration of alkaline earth metal in the admixture of reactants is limited so that in the final phosphor the mole ratio of alkaline earth metal to alkali metal is less than about 0.1:1.

For example, referring again to FIG. 1, in the system $B_2O_3$—BaO—$BaBr_2$ as shown in FIG. 1, glass-forming compositions are within the following limits: $B_2O_3$ 15–87 moles %, BaO 13–65 moles %, and $BaBr_2$ 0–45 moles %. A glass-ceramic which contains $BaBr_2$ can be precipitated from glass compositions within these broad limits. Phosphor crystal formation is favored in a region which lies closest to the $BaBr_2$ apex of FIG. 1, in the region $B_2O_3$ 15–50 moles %, BaO 30–65 moles %, and $BaBr_2$ 20–45 moles %. The composition of the storage phosphor $Ba_2B_5O_9Br$ lies within, and can be precipitated from, glasses within the broad bounds of this same system and is favored by compositions within the limits $B_2O_3$ 40–70 moles %, BaO 25–55 moles %, and $BaBr_2$ 5–20 moles %, and more preferably by compositions within $B_2O_3$ 50–60 moles %, BaO 30–40 moles %, and $BaBr_2$ 5–15 moles %, and most preferably by a composition of its own stoichiometry: $B_2O_3$ 55.6 moles %, BaO 33.3 moles %, and $BaBr_2$ 11.1 moles %. On crystallization, this product would be composed almost entirely of $Ba_2B_5O_9Br$ crystals, with a minimum mount of residual glass acting as a binder.

In the system $B_2O_3$—BaO—BaFBr, illustrated in FIG. 2, the broad glass-forming region is within the limits enclosed by the ranges $B_2O_3$ 15–87 moles %, BaO 13–63 moles %, and BaFBr 0–35 moles %. In order to maximize precipitation of BaFBr, compositions nearest to the BaFBr apex of FIG. 2 are favored, the preferred limits being $B_2O_3$ 15–55 moles %, BaO 35–63 moles %, and BaFBr 10–35 moles %.

In the system $B_2O_3$—BaO—$BaCl_2$, the glass-forming system, as illustrated in FIG. 3, is enclosed by the ranges $B_2O_3$ 10–87 moles %, BaO 13–55 moles %, and $BaCl_2$ 0–50 moles %. In order to maximize precipitation of BaCl2, a storage phosphor, the preferred limits are $B_2O_3$ 10–40 moles %, BaO 35–55 moles %, and $BaCl_2$ 20–50 moles %.

The admixed combination of species is fired at a temperature of from about 500° to about 1550° C. If oxide network-formers are used, firing is at a temperature from about 900° to about 1550° C., or more preferably, from about 900° to about 1350° C. The firing is continued until a melt that is homogeneous or at least substantially homogeneous is formed from the admixture of primary components. Firing times are generally not critical, but excessively long firing times can lead to volatilization of components, while excessively short firing times present a risk of inadequate mixing. Useful firing times are expected in the range of about 0.25 to about 100 hours. More convenient firing times are from about 0.25 to about 2.5 hours. The firing can be performed in a reducing, slightly reducing, or inert atmosphere as appropriate to prevent degradation of reactants or products during the firing process.

Although the concentrations of the reactants in the admixture are selected such that, upon firing, a melt is produced that is homogeneous or substantially homogeneous as to the components of the glass-forming system and the components of the phosphor, the melt can contain other components for which the melt is not homogeneous. For example, the melt could contain dispersed inclusions that remain solid at the temperature of the melt. A second phosphor could be added in this manner, such that the final glass-ceramic would have dispersions of two different phosphors in a glass matrix: one phosphor provided as an inclusion and the other phosphor the product of vitrification, followed by devitrification.

The melt product is shaped, either while molten from firing or after cooling and reheating to a molten condition. The vitreous melt product can be shaped, in molten form, by any of the various procedures generally used in the shaping of molten glasses. These procedures are referred to collectively herein as "molten-shaping". Examples of such procedures include casting, including centrifugal casting or spinning; pressing; sagging; drawing; rolling; and blowing. The procedures used are dependent upon the desired configuration of the vitreous article and resulting glass-ceramic article. In a particular embodiment of the invention, the molten-shaping is the casting of the melt as a glass preform having substantially the same shape as the desired glass-ceramic article. After the molten-shaping, the shaped vitreous article is cooled slowly to minimize damage due to thermal stresses.

The shaped vitreous article (also referred to hereafter as "intermediate") can be used immediately to produce the glass-ceramic of the invention; however, the intermediate is useful as a vehicle for storing, shipping, and handling the admixture of reactants in a particularly convenient form. Some of the vitreous articles of the invention are substantially inert and are thus highly resistant to degradation due to water or other ambient contaminants. The intermediate can be made in bulk and can be stored in individual aliquots sized to meet projected needs. The intermediate can be prepared at one location for shipment to another location as a large mass or series of aliquots. The aliquots can be provided in standardized sizes appropriate to particular uses do as to minimize spillage and waste during shipping and handling. The intermediate can be shaped to fit particular storage or handling requirements or can be shaped, in effect, so as to provide its own shipping container or a container for shipping another product. For example, the intermediate can be supplied as a continuous fiber or ribbon, from which lengths can be taken as needed.

In the preparation of the glass-ceramic article, the intermediate or vitreous article is configured to provide a glass preform having nearly the configuration of the glass-ceramic article. The intermediate can be molten-shaped from the original melt to provide the glass preform. The intermediate can instead be remelted and molten-shaped again to provide a glass preform of a desired configuration. The intermediate can also be machined to produce a desired glass preform.

The glass preform is then incompletely devitrified to provide a dispersion of crystals in a residual viscous matrix. In the incomplete devitrification, the intermediate is thermally treated at in a temperature range or ranges sufficiently low to thermodynamically favor the nucleation and precipitation of crystals, but high enough to promote reasonable crystal growth kinetics. The resulting glass-ceramic article of the invention is then allowed to cool and can be machined or otherwise processed as desired for a particular use. Procedures useful in preparing glass-ceramics from glasses are well known to those skilled in the art. For example, nucleation additives can be combined with the admixture of reactants, prior to firing, to encourage nucleation during devitrification. Similarly other additives can be combined with the admixture of reactants, for example, to control the properties of the melt, or the crystallization behavior of the glass, or the properties of the final product; including such properties as strength and durability under ambient conditions. Care should be taken, however, to avoid additives that deactivate the phosphor of the resulting glass-ceramic.

In preferred embodiments of the invention, the vitreous article is devitrified by being reheated at a second temperature range lower than the firing temperature for from about 2 to about 48 hours or, more preferably, from 2 to 24 hours. The second temperature range is from about 300° to about 1100° C. If oxide network-formers are used, the second temperature range is from about 600° to about 1100° C. The second temperature range is insufficient to render the glass preform substantially plastic. The devitrification causes the precipitation, within the glass preform, of a dispersion of phosphor crystals as a majority phase within a vitreous matrix. The vitreous article can optionally be reheated only in selected areas, for example by the use of a laser of appropriate output.

In preferred embodiments of the invention, the phosphor crystals comprise oxygen and a combination of species characterized by the structural formula:

$M^a{}_n M^b{}_r X_z \cdot mR{:}jA$  (formula 2)

In formula 2, $M^a$, $M^b$, X, R, j, and A in formula 2 have the same meanings as in formula 1. The value of n is from 0 to about 0.5. The value of r is from 0 to about 0.33. The value of z is from 0 to about 0.67. The value of m is from about $1\times10^{-6}$ to about 0.18.

Devitrification conditions can be modified, to vary the size of the phosphor crystals precipitated, as appropriate for a particular use. For example, if the glass-ceramic article is a radiographic storage phosphor plate, speed and resolution may be optimized by modifying devitrification conditions to provide a crystallite size in the rage 1–25 microns, preferably in the range 2–10 microns.

Phosphor concentrations in the glass-ceramic, can be maximized by the use of a glass-forming composition that includes the oxide R and, in addition, includes components that have the same stoichiometry or approach the stoichiometry of the desired phosphor.

Final shapes of articles of the invention depend upon the requirements of a particular use, taking into account such factors as structural strength. Specific examples of final shapes include vitreous fibers and glass-ceramic plates including photostimulable phosphor. The articles of the invention are not, however, limited to simple forms and can have complex three-dimensional shapes. Both vitrified articles of the invention, the shaped vitreous article and the glass-ceramic article tend to be resistant to corrosive environments and can be made mechanically robust. The articles can be machined and processed in the same manner as other glasses and glass-ceramics. For example, the glass-ceramic article can be optically ground and polished.

The glass-ceramic article can be combined with other components as desired for a particular use. For example, a storage phosphor plate or screen could include an appropiate glass-ceramic article of the invention, and one or more rigid supports, reflective layers, and other components of conventional storage phosphor screens known to those of skill in the art. Physical support can be provided by a rigid plate of aluminum or the like. For the highest attainable speeds a white support, such as a titania or barium sulfate loaded or coated support can be employed. Dyes and pigments are commonly loaded into supports to enhance absorption or reflection of light. Metal layers, such as aluminum, enhance reflection. Air can be trapped in supports to reflect ultraviolet and visible light. Particular reflective supports which offer a balance of speed and sharpness are those containing reflective microlenslets, such as are disclosed in U.S. Pat. No. 4,912,333 to Roberts, et al. Additives could be provided in the glass-ceramic in a manner similar to their use in conventional phosphor screens. A light absorber could be added to the glass-ceramic, in those instances in which it is desired to reduce the effective thickness of a phosphor layer below its actual thickness. With storage panels, it is preferable to include a dye or pigment which absorbs some of the stimulating radiation, generally provided by a laser; but mostly reflects emitted light. U.S. Pat. No. 4,491,736, to Teraoka, teaches the use of such materials in storage panels. Any one or combination of conventional panel features compatible with the features described herein can, of course, be employed. Conventional storage panel constructions are disclosed in U.S. Pat. No. 4,380,702 to Takahashi et al. Conventional intensifying panel constructions are disclosed in *Research Disclosure*, Vol. 184, August 1979, Item 18431.

The following Examples and Comparative Examples are presented to further illustrate and elucidate some preferred modes of practice of the invention. Unless otherwise indicated, all starting materials were commercially obtained.

EXAMPLE 1

Boron oxide, barium carbonate, barium bromide and europium (III) oxide were weighed in the proportions necessary to give 10 grams of a glass of composition $5B_2O_3 \cdot 3BaO \cdot BaBr_2{:}Eu$ in which Eu(II) was present at the level of 1 mole %. The stoichiometry of the major components is identical to $Ba_2B_5O_9Br$. The mixed batch was placed in a ceramic crucible and prereacted overnight in a tube furnace at 650° C., under an atmosphere of 4% hydrogen in argon in order to reduce Eu(III) to Eu(II) before any melting occurred. With the reducing atmosphere maintained, the furnace temperature was raised to 1000° C. over 1.5 hours. After 30 minutes at this temperature, the furnace was opened, the crucible withdrawn and the melt quickly poured into a carbon mold 25 mm in diameter which had been preheated in a box furnace at 400° C. The furnace was switched off and the glass in its mold cooled slowly to room temperature. The product was a completely clear yellow glass button. After a thermal treatment of 2 hours at 700° C., the button was completely opaque and pale yellow, and it was white by the time it had again cooled to room temperature. After being exposed to x-rays, the button exhibited photostimulated luminescence. The primary crystalline phase was identified by x-ray powder diffraction as $Ba_2B_5O_9Br$, but some $BaB_2O_4$ and another unidentified phase were also present.

EXAMPLE 2

Equivalent amounts of barium fluoride and barium bromide were mixed and heated in a ceramic crucible to 700° C. overnight, then cooled and ground to provide a stock powder of composition BaFBr. Boron oxide, barium oxide, and barium fluorobromide, with 0.1 mole percent $Eu_2O_3$ were mixed in quantitities necessary to give 10 grams of the composition $2B_2O_3 \cdot 5BaO \cdot 3BaFBr{:}Eu$. The batch was reacted overnight in a 25 mm diameter graphite container at 650° C. under an atmosphere of 4 percent hydrogen in argon to reduce Eu(III) to Eu(II). The temperature was raised slowly to 975° C. for 30 minutes, then cooled to 800° C. over a 3 hour period, and finally cooled to 400° C., at which time the mold was removed from the furnace and cooled to room temperature. The resulting button was opaque and yellow.

After being irradiated with x-rays, it showed strong photostimulated luminescence. BaFBr crystals were identified by x-ray powder diffraction.

EXAMPLE 3

Boric oxide, silica, barium carbonate, barium fluorobromide and europium (III) oxide were mixed so as to yield 75 grams of the composition $22B_2O_3.5SiO_2.49.9BaO.23BaFBr.0.1EuO$. The batch was prereacted in a ceramic crucible at 675° C. for 16 hours under an atmosphere of 4% hydrogen in argon to reduce Eu(III) to Eu(II), then allowed to cool to near room temperature in the furnace. A standard solution containing 1 mg of gold per mL of 5% HCl was diluted with deionized water to 0.13 mg per mL, and 7.5 mL of this solution added to the prereacted batch. This volume of liquid was sufficient to just wet the entire batch, which now contained 13 ppm by weight of gold as a nucleating agent. After being allowed to dry on a warm hotplate, the batch was ground in a mortar, and placed in a ceramic crucible. It was heated slowly under 4% hydrogen in argon to 1000° C., held for 20 minutes, then withdrawn and poured quickly into a 70 mm diameter preheated graphite mold. The product was annealed by cooling slowly from 450° C. to room temperature. The disc thus formed was a clear greenish glass, which was then thermally treated under a reducing atmosphere at 775° C. for 16 hours, then cooled to room temperature. It was now opaque and light green in color and had shown some shrinkage. Crystals from another similarly formed disc were identified by x-ray powder diffraction as BaFBr. The disc was ground optically flat on both faces and subjected to x-ray imaging tests. Images of a lead bar target taken at 50 kVp using a 30 second exposure with 1.5 mm Al beam filtration, and retrieved by scanning with a 30 mW laser at 647 nm with a 100 micrometer pixel size, showed visual resolution out to 3 cycles/mm.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing a vitrified glass-ceramic article comprising the steps of:

admixing a combination of species characterized by the structural formula:

$$d^1M^aX.d^2M^bX_2.e^1M^a_2O.e^2M^bO.qR:jA$$

wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is at least one member selected from the group consisting of $BeF_2$, and oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20;

firing said admixed combination of species at a temperature of from about 500 to about 1550° C., for from about 0.25 to about 100 hours, to form a melt having a single liquid;

molten-shaping the product of said melt to form a vitrified article; and heating at least a portion of the vitrified article to form phosphor crystals in a residual vitreous matrix.

2. A method for preparing a vitrified article comprising the steps of:

admixing a combination of species characterized by the structural formula:

$$d^1M^aX.d^2M^bX_2.e^1M^a_2O.e^2M^bO.qR:jA$$

wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is at least one member selected from the group consisting of $BeF_2$, and oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20;

adding a nucleating agent to said admixed combination of species;

firing said admixed combination of species at a temperature of from about 500 to about 1550° C., for from about 0.25 to about 100 hours, to form a melt having a single liquid; and molten-shaping the product of said melt.

3. The method of claim 1 wherein said firing temperature is from 900° C. to 1350° C.

4. The method of claim 1 wherein said molten-shaping comprises casting said melt as a glass preform.

5. The method of claim 4 further comprising machining said glass preform.

6. A method for preparing glass-ceramic article comprising the steps of:

admixing a combination of species characterized by the structural formula:

$$d^1M^aX.d^2M^bX_2.e^1M^a_2O.e^2M^bO.qR:jA$$

wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is at least one member selected from the group consisting of BeF$_2$, and oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20;

firing said admixed combination of species at a temperature of from about 500° to about 1550° C., for from about 0.25 to about 100 hours, to form a melt having a single liquid;

casting said melt as a glass preform; and reheating at least a portion of said preform at a second temperature range lower than said firing temperature, said second temperature range being from about 300° C. to about 1100° C. for from about 2 to about 48 hours, said second temperature range being insufficient to render said preform substantially plastic to precipitate within said glass preform a dispersion of phosphor crystals, said crystals comprising oxygen and a combination of species characterized by the structural formula:

$$M^a{}_nM^b{}_rX_z.mR{:}jA$$

wherein $M^a$, $M^b$, X, R, j, and A have the same meanings as previously recited;

n is from 0 to about 0.5;

r is from 0 to about 0.33;

z is from 0 to about 0.67; and m is from about $1\times10^{-6}$ to about 0.18.

7. The method of claim 6 wherein said crystals have longest dimensions of from about 1 to about 25 micrometers.

8. The method of claim 6 wherein said crystals have longest dimensions of from about 2 to about 10 micrometers.

9. The method of claim 6 wherein:

R is B$_2$O$_3$ or P$_2$O$_5$, or a combination thereof, $d^1$ is from 0 to about 0.5, $d^2$ is from 0 to about 0.5, $e^1$ is from about 0 to about 0.65, $e^2$ is from about 0 to about 0.65, $d^1+d^2$ is from 0.025 to about 0.5;

$d^1+e^1$ is from about 0 to about 0.9, and $d^2+e^2$ is from about 0 to about 0.9.

10. The method of claim 6 wherein:

R is SiO$_2$ or GeO$_2$, or a combination thereof, $d^1$ is from 0 to about 0.5, $d^2$ is from 0 to about 0.5, $e^1$ is from about 0 to about 0.65, $e^2$ is from about 0 to about 0.65, $d^1+d^2$ is from 0.025 to about 0.5;

$d^1+e^1$ is from about 0 to about 0.9, and $d^2+e^2$ is from about 0 to about 0.9.

11. The method of claim 1 wherein:

R is B$_2$O$_3$ or P$_2$O$_5$, or a combination thereof, $d^1$ is from 0 to about 0.5, $d^2$ is from 0 to about 0.5, $e^1$ is from about 0 to about 0.65, $e^2$ is from about 0 to about 0.65, $d^1+d^2$ is from 0.025 to about 0.5;

$d^1+e^1$ is from about 0 to about 0.9, and $d^2+e^2$ is from about 0 to about 0.9.

12. A method for preparing a vitrified article comprising the steps of:

admixing a combination of species characterized by the structural formula:

$$d^1M^aX.d^2M^bX_2.e^1M^a{}_2O.e^2M^bO.qR{:}jA$$

wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is SiO$_2$ or GeO$_2$, or a combination thereof;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Fin, and In, and combinations thereof;

$d^1$ is from 0 to about 0.5;

$d^2$ is from 0 to about 0.5;

$e^1$ is from 0 to about 0.65;

$e^2$ is from 0 to about 0.65;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20;

firing said admixed combination of species at a temperature of from about 500° to about 1550° C., for from about 0.25 to about 100 hours, to form a melt having a single liquid; and molten-shaping the product of said melt.

13. A method for preparing a glass-ceramic article the steps of:

admixing a combination of species characterized by the structural formula:

$$d^1M^aX.d^2M^bX_2.e^1M^a{}_2O.e^2M^bO.qR{:}jA$$

wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is at least one oxide selected from the group consisting of oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20;

firing said admixed combination of species at a temperature of from about 900° to about 1350° C., for from about 0.25 to about 2.5 hours, to form a substantially homogeneous melt;

casting said melt as a glass preform;

reheating said preform at a second temperature lower than said firing temperature, said second temperature being from about 600° C. to about 1100° C. for from about 2 to about 48 hours, said second temperature being insufficient to render said preform substantially plastic to precipitate within said glass preform a dispersion of radiographic phosphor crystals, said crystals comprising oxygen and a combination of species characterized by the structural formula:

$M^a{}_nM^b{}_rX_z.mR:jA$ wherein $M^a$, $M^b$, X, R, j, and A have the same meanings as previously recited;

n is from 0 to about 0.5;

r is from 0 to about 0.33;

z is from 0 to about 0.67; and m is from about $1\times10^{-6}$ to about 0.18;

said phosphor crystals being dispersed as a majority phase within a vitreous matrix.

14. A vitrified article comprising a mass of phosphor crystals dispersed in a vitreous matrix, said matrix and said phosphor crystals together comprising a combination of species characterized by the structural formula $d^1M^aX.d^2M^bX_2.e^1M^a{}_2O.e^2M^bO.qR:jA$ wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is at least one member selected from the group consisting of $BeF_2$, and oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20.

15. A vitrified article which comprises a vitreous portion and phosphor crystals disposed in said vitreous portion, said phosphor and said crystals comprising oxygen and a combination of species characterized by the structural formula:

$M^a{}_nM^b{}_rX_z.mR:jA$ wherein $M^a$ is selected from the group consisting of the alkali metals: Li, Na, K, Rb and Cs, and combinations thereof;

$M^b$ is selected from the group consisting of the divalent metals: Be, Mg, Ca, Sr, Ba, Zn, Cd, Cu, and Ni, and combinations thereof;

X is selected from the group consisting of F, Cl, Br, and I, and combinations thereof;

R is at least one member selected from the group consisting of $BeF_2$, and oxides of: B, Si, Ge, and P;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

j is from $1\times10^{-6}$ to about 0.20;

n is from 0 to about 0.5;

r is from 0 to about 0.33;

z is from 0 to about 0.67;

m is from about $1\times10^{-6}$ to about 0.18.

16. A vitrified article prepared by a method including the shaping of a molten, at least substantially homogeneous, vitreous mass, said mass and said article, as a whole, each having a composition including a combination of species characterized by the structural formula:

$d^1M^aX.d^2M^bX_2.e^1M^a{}_2O.e^2M^bO.qR:jA$ wherein:

each $M^a$ is selected from the group consisting of the alkali metals: Li, Na, K, Rb and Cs, and combinations thereof;

each $M^b$ is selected from the group consisting of the divalent metals: Be, Mg, Ca, Sr, Ba, Zn, Cd, Cu, and Ni, and combinations thereof;

each X is selected from the group consisting of F, Cl, Br, and I, and combinations thereof;

R is $SiO2$ or $GeO2$, or a combination thereof;

A is selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In, and combinations thereof;

$d^1$ is from 0 to about 0.5;

$d^2$ is from 0 to about 0.5;

$e^1$ is from 0 to about 0.65;

$e^2$ is from 0 to about 0.65;

$d^1+d^2$ is from 0.025 to about 0.5;

$e^1+e^2$ is from 0 to about 0.65;

$d^1+e^1$ is from 0 to about 0.9;

$d^2+e^2$ is from 0 to about 0.9;

$d^1+e^1+d^2+e^2$=from about 0.05 to about 0.9;

$d^1+e^1+d^2+e^2+q=1$; and j is from $1\times10^{-6}$ to about 0.20.

* * * * *